Dec. 28, 1965  J. H. RISEMAN  3,226,313
GLASS ELECTRODE AND METHOD OF MAKING THE SAME
Filed July 31, 1964

INVENTOR.
JOHN H. RISEMAN
BY Robert J. Schiller
ATTORNEY

United States Patent Office 3,226,313
Patented Dec. 28, 1965

3,226,313
GLASS ELECTRODE AND METHOD OF MAKING THE SAME
John H. Riseman, Cambridge, Mass., assignor to Corning Glass Works, Corning, N.Y., a corporation of New York
Filed July 31, 1964, Ser. No. 386,661
13 Claims. (Cl. 204—195)

This invention relates to glass electrodes for electrochemical measurement, and more particularly to improved glass electrode structures and methods for making the same.

Conventional glass electrodes usually are formed of a tubular, high resistance support or stem having an ion-sensitive membrane occluding one end of the support, generally in the form of a blown bulb. Disposed in the bulb is an electrolyte solution such as 0.1 N HCl. Contacting the latter is an electrically conductive lead, typically an Ag-AgCl wire. In one variety of such electrodes, as is shown in the U.S. Patent 2,256,733 issued September 23, 1941 to H. H. Cary et al., the lead wire is supported by a glass plug adapted to fit snugly within the interior of the stem. The glass plug and glass stem are sealed to one another as by wax, styrene cement, a ground-glass fitting or the like. This type of structure has been used for a number of years, as established by U.S. Patent 2,756,203 issued July 24, 1956 to P. T. Gilbert, Jr., but possesses a number of shortcomings, the largest of which apparently has arisen out of the difficulty of providing an adequate leak-proof seal.

Another variety of such electrode which purported to solve these problems is disclosed in U.S. Patent 2,311,977 issued February 23, 1943 to E. D. Coleman. This variety of electrode is characterized in having the usual elongated tubular stem, one end of which bears the ion-sensitive glass bulb. Disposed coaxially within the stem and spaced from the interior walls thereof is another glass tube having a lead extending from a sealed end thereof and into the interior of the ion-sensitive bulb. The other end of the interior glass tube is sealed to the corresponding extremity of the glass stem. This electrode structure further includes an outer jacket about the stem, which jacket includes electrical shielding.

Electrodes of this type present some problems of their own. For example, of necessity a substantial portion of the lead must remain unshielded unless one is willing to extend the shielding all the way down the stem to the bulb. In such case, the usage of the electrode would require immersion or exposure of the jacketing material in test solutions, possibly with deleterious results. Secondly, the internal glass tube is supported only at the sealed end of the electrode and becomes quite susceptible to damage from mechanical vibration.

It is the principal object of the present invention to provide a glass electrode and a method of making same which is free of these and other objectionable aspects. Other objects of the present invention are to provide a glass electrode which is particularly simple to construct, relatively inexpensive, and particularly rugged; and to provide a method for making a novel electrode characterized by its simplicity and accuracy of construction; and to provide such a method including the steps of forming the internal lead-bearing glass tube to include an upstanding circular flange or collar adapted to fit within the ion-sensitive bulb-bearing stem, positioning the collar within the stem such that a contact portion of the lead is disposed internally of the bulb, fusing the periphery of the collar to the adjacent wall of the stem, filling the bulb with an electrolyte solution through an aperture in an ion-insensitive glass portion of the electrode, and closing the aperture so as to seal the electrolyte within the bulb.

Other objects of the present invention will in part be obvious and will in part appear hereinafter. The invention accordingly comprises the processes involving the several steps and the relation and order of one or more of such steps with respect to each of the others, and the products possessing the features, properties and relation of elements which are exemplified in the following detailed disclosure and the scope of the application all of which will be indicated in the claims.

For a fuller understanding of the nature and objects of the present invention, reference should be had to the following detailed description taken in connection with the accompanying drawings wherein.

Figure 1:
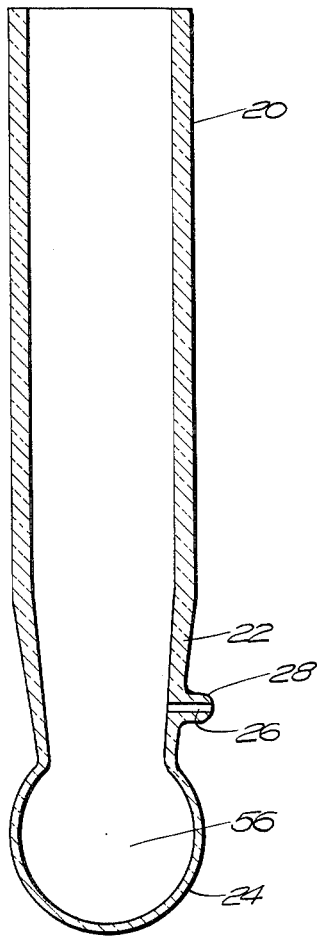
FIGURE 1 is a schematic cross-section taken along the long axis of an exemplary stem and bulb of an electrode embodying the principles of the present invention.

According to one form of the invention, the electrode includes an element, such as is shown in FIGURE 1, which comprises a hollow tubular body or glass stem 20 preferably of circular cross section and formed of a high resistance glass, for example, one having a bulk resistance of about $1 \times 10^{13}$ ohms-cm. or higher. Typically, this glass is a lead sealing glass having a coefficient of thermal expansion of about $9.2 \times 10^{-6}$ approximately within the range of 0 to 350° C. In a preferred embodiment, as shown in FIGURE 1, end portion 22 of stem 20 is provided with a smaller cross-section as by narrowing or tapering stem 20. The narrower extremity of end portion 22 is occluded or covered with a membrane of ion-sensitive glass preferably in the form of bulb 24. Depending upon the ion-sensitive characteristics desired, bulb 24 can be formed of a large number of glasses of various types well known in the art. The type of glass chosen for stem 20 should be compatible with the membrane glass with respect to their coefficients of thermal expansion in order to avoid undue stresses at the membrane-stem junction. For example, where the bulb is intended to be pH sensitive, a suitable pH glass composition which exhibits a close match with respect to a coefficient of thermal expansion of the stem glass described can be selected from among the glasses lited in U.S. Patent 2,462,843 issued to H. Cary et al. on March 1, 1949.

In a preferred embodiment, stem 20, preferably at constricted portion 22 thereof is provided with a small opening 26, shown as being defined by nipple 28. Opening 26 need only be large enough to allow the introduction, for example, of a hypodermic needle therein, and preferably is small enough so that it can be readily and completely sealed simply by the application of sufficient heat to the tip of nipple 28 so as to melt the latter.

Figure 2:
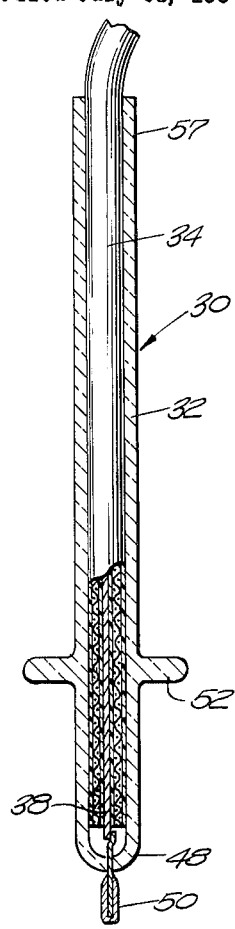
FIGURE 2 is a schematic view partly in cross-section taken along the long axis of a lead-supporting element of an electrode embodying the principles of the present invention.

The product of the present invention also includes elongated element 30, shown particularly in FIGURE 2, and intended to support an internal lead for the electrode, and also to define an internal electrolyte chamber. To this end, member 30 is formed of a hollow glass tube 32 having an outside diameter sufficiently less than the inside diameter of stem 20 so as to allow member 30 to be freely inserted into the interior of the stem. Disposed within the hollow interior of tube 32 is lead assembly 34. As shown in detail in FIGURE 3, the latter is in the form of a coaxial cable comprising a central, electrically conductive wire 38 surrounded by an electric insulating material 40 jacketed in an electrically shielding coat such as metallic braid 42 and covered with a heat resistant insulator 44. For example, one can employ the coaxial cable with a central copper wire coated with polyethylene insulation and encased in a copper braid which is in turn coated externally with vinyl rubber.

Adjacent one end of member 30, electrically conductive wire 38 is coupled as by solder to wire 46 which is preferably of platinum. The latter constitutes an extension of wire 38 and is sealed into end 48 of tube 32 and extends therefrom. The end of the platinum wire which extends out of sealed end 48 is preferably coated with a silver-silver chloride covering or mass 50. The latter can be applied as by coating the exposed end of wire 44 with silver and then subjecting the silver coating to a hydrochloric acid bath. Alternatively, an Ag-AgCl paste can be coated onto the platinum wire. In both cases, after the silver chloride has been emplaced, it can be sintered or baked to insure mechanical strength. It will be seen that in the structure thus described, optimum electrical shielding is provided in that the shielding braid covers substantially all of the electrical lead except that portion or extension which is sealed in the glass, and extends outwardly of end 48.

Disposed about member 30 adjacent sealed end 38 is an uptsanding glass flange or collar 52 which is in the form of a continuous ring formed integrally with glass tube 32, extending in a plane substantially perpendicular to the long axis of member 30, having an external peripheral configuration adapted to fit closely within the cross-section of the unrestricted portion of stem 20.

The choice of glass for member 30 is largely governed by two factors. First, in order to provide a good metal-to-glass seal between tube 32 and wire 46 in known manner, it is desirable to match rather closely their respective coefficients of thermal expansion.

Secondly, it is intended to fuse collar 52 to tube 20 and in order to avoid creating a glass-to-glass junction in which thermal stress will appear, at least the glass of the periphery of collar 52 should be, within close limits, matched to the coefficient of the thermal expansion of the glass stem 20.

Figure 5:
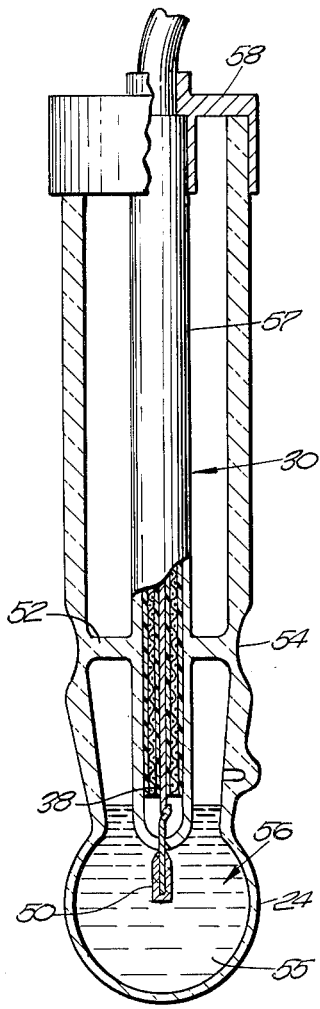
FIGURE 5 is a schematic representation showing the embodiment of FIGURES 1 and 2 combined to form a complete electrode according to the present invention.

The electrode portions thus described and shown in FIGURES 1 and 2 are combined in the following manner to form the electrode structure shown in FIGURE 5. After member 30 has been assembled, it is inserted into the interior of stem 20 such that end 48 is directed toward bulb 24. In order to provide for simple and accurate positioning of member 30 within stem 20, means are provided for engaging collar 52 when the latter reaches a predetermined position within the stem. Tapered end 22 of stem 20 forms such means; because collar 52 is approximately the same diameter of the interior of stem 20 with sufficient tolerance to allow for a sliding fit, the collar will engage the constricted portion of the stem at end 22, preventing further movement of member 30 into the stem. This establishes the position of outwardly extending wire 46 and Ag-AgCl mass 50 at a substantially central location in bulb 24. A number of other modifications of stem 20 can be used, within the scope of the invention for arresting collar 52 and properly positioning member 30. For instance, stem 20 need not be constricted, but can be of uniform diameter and include an internal flange or projections intended to engage collar 52. Other alternative methods such as the use of jigs or the like are considered undesirable in that they require the use of unnecessary steps or apparatus.

When member 30 is disposed substantially coaxially with stem 20, and collar 52 is engaged with the interior wall of the stem so that member 30 cannot be readily forced any further toward bulb 24, the external surface of that portion of the wall of stem 20 which is in engagement with the collar is heated to a sufficient temperature and for a time such that the glass of that portion of the wall is rendered workable. For example, the assembled stem and member 30 are mounted in a lathe so that the assembly rotates about its long axis while a narrow gas flame is directed towards the surface of the stem adjacent the collar-stem intersection. The heating of a stem of glass for example, in this manner, will render both the portion of the stem and the periphery of the collar workable, and if the temperature is sufficiently high, fusion of the two will occur without further effort. However, in order to avoid unnecessarily high temperatures, it is preferred to work the glass as by pressing a tool, e.g. of graphite, against the softened surface of the stem and toward the interior thereof as the assembly rotates in the lathe. Where no lathe is used, the same effect can be obtained by rotating the tool about a stationary stem. Heating is continued and the tool is employed to work the glass until the entire periphery of the collar has become joined, i.e. sealed to the interior wall of the stem as shown in FIGURE 5. Where the sealing of the collar periphery to the stem is aided with a tool, a shallow circumferential depression 54 will usually be formed as shown in FIGURE 5, but will not affect the operation of the electrode in any sense.

It is preferred not to anneal the joint thus formed, in order to avoid the injurious effects that annealing frequently has on the ion-sensitive glass of the bulb. However, stresses at the joint can be reduced by placing the electrode assembly immediately after working into a thermally insulating jacket which, however, does not enclose bulb 24. Thus the bulb is exposed to normally cool room-temperature air while the stem is kept at a temperature which decreases slowly from its relatively high starting level. Although this controlled cooling step is not necessary, it will increase the chance that a given electrode will not later fracture because of high internal stress at the collar-stem junction. This controlled cooling step can become important where there is any substantial mismatch between the coefficients of thermal expansion of the glass of tube 32 and the glass of stem 20.

After the collar-stem junction is cooled, sufficient electrolytic fluid 55 such as 0.1 N KCl solution is injected through opening 26 into the chamber formed by collar 52, end 22, and bulb 24. Preferably, the chamber is filled until only a small air space is left of sufficient size to allow for thermal expansion of the electrolytic fluid. The end of nipple 28 is then heated, preferably quite rapidly, until the glass is at least workable enough so that opening 26 can be collapsed and sealed as shown. If raised to a high enough temperature, the liquidity of the glass alone will tend to collapse nipple 28 into opening 26 and provide the requisite seal.

To complete assembly of the electrode structure, means are provided for supporting extremity 57 of member 30, out of which extremity lead assembly 34 extends. As shown in FIGURE 5, such means can be formed as a simple cap 58 of synthetic polymeric material or the like, shaped to form a snug fit about extremity 57 and also about the corresponding end of stem 20. Cap 58 can be, of course, cemented into place if desired. Inasmuch as the primary function of the cap is to support member 30, neither the material from which it is made nor the cement, if used, is considered critical. Indeed, the cap should be formed of glass and melted into place, much as collar 52 was sealed to tube 20. Thus, it will be seen that member 30 is supported at two places to provide a very durable structure, at one of those places the supporting structure being in the form of a superior glass-to-glass seal which also forms a portion of a wall of a considerably smaller electrolyte-chamber than is shown in prior art structures. Additionally, the electrode structure is, because of the location of the coaxial cable in member 30, extremely well shielded and very compact.

Figure 4:
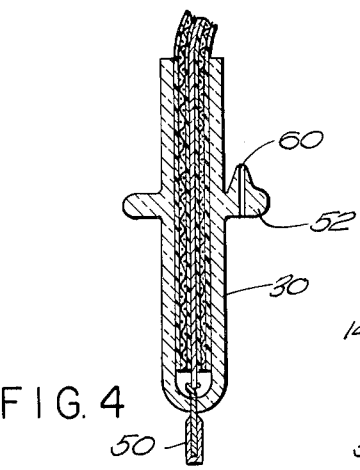
FIGURE 4 is a schematic cross-section of another form of a lead-supporting element.

The secondary support provided by cap 58 for member 30 is not necessary to the invention, particularly in electrode assemblies wherein member 30 is short, for example relative to the size of bulb 24, such as member 30 shown in FIGURE 4. One of the more important aspects of the structure of the present invention lies in the location of collar 52 adjacent end 48 of member 30 and therefore closely adjacent the junction of bulb 24 with stem 20. Because of this adjacency of the collar to the bulb, the size of chamber 56 is limited such that, when the electrode assembly is in use, the solution under test and in which the ion-sensitive bulb is usually well immersed will tend to operate to shield the entire chamber 56 including the bulb, electrolyte and mass 50. On the other hand, were chamber 56 to extend a large distance along the length of stem 20 (as would clearly be the case if collar 52 were located for example where cap 58 is shown) the chamber would either include a large volume of electrolyte which would be difficult to shield with the test solution, or would contain a very large air space relative to the electrolyte volume. In the latter instance, not only are there problems of positional sensitivity, but the interior walls of the air-space in the chamber would nevertheless tend to be moist and provide some undesirable pickup. The need for outer shielding as taught by the prior art is indicated in such a structure.

Although the structure thus described was formed by a method including a step involving filling a chamber with electrolyte through an opening in the wall of stem 20, it will be appreciated that the location of the opening can be modified. For example, if the electrode structure is short enough or a long enough hypodermic needle is employed, the opening into the interior of bulb 24 can be provided as opening 60 located in collar 52 of member 30 as shown in the alternative embodiment of FIGURE 4. In forming an electrode with a lead structure of this type, care should be taken when sealing collar 52 to stem 20 to avoid heating or working the collar to the point at which opening 60 would be closed.

The use of glass nipples, such as 28 in FIGURE 1 or that containing opening 60 as shown in FIGURE 4, through which the electrolyte chamber is filled and which is then sealed by melting, tends to introduce a weak or strained spot in the electrode unless the nipple is very carefully formed and sealed. An alternative method of filling the electrolyte chamber of the electrode of the invention is to use a member 130 as shown in enlarged view in FIGURE 6, in place of member 30 in the formation of an electrode of the present invention.

Figures 3, 6:
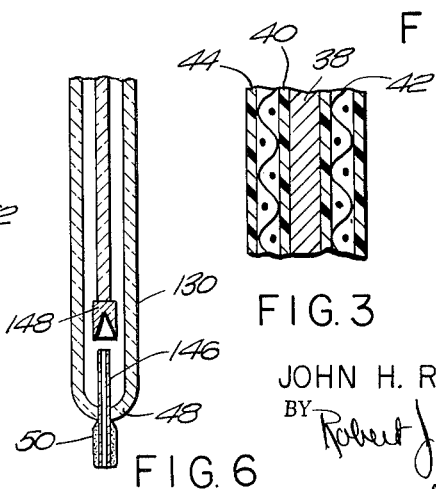
FIGURE 3 is an enlarged detail of a portion of FIGURE 2.
FIGURE 6 is a schematic cross-section of yet another form of a lead-supporting element showing a tool used in connection therewith.

As shown in FIGURE 6, member 130 comprises the usual glass tube 32 having sealed end 48 with internal glass collar 52 adjacent thereto. Sealed into end 48 and extending therefrom is a hollow platinum tube 146 which is open at both ends and therefore, when collar 52 is sealed to stem 20 as hereinbefore described, constitutes a passageway between the interior of member 130 and electrolyte chamber 56 formed by the sealing of collar 52 to stem 20. Of course, where member 130 is employed, the form of stem 20 used therewith does not require nipple 28 with its opening 26, as shown in FIGURE 4. Tube 146 obviously then constitutes an electrical equivalent of wire 46 of the embodiment of FIGURE 2.

As shown in FIGURE 6, that end of tube 146 which projects outwardly from sealed end 48 supports mass 50 of the silver-silver halide variety heretofore described, the mass being so arranged so as not to obstruct the opening through tube 146.

Once member 130 of the type shown in FIGURE 6 is properly sealed into an appropriate stem 20, the electrolyte chamber thus formed can be readily filled by insertion of the end of a syringe, such as a hypodermic needle, into the passage in tube 146 and the injection of the electrolyte liquid fluid therethrough and into the chamber. After the chamber has been thus filled to a predetermined level, tube 146 is sealed at the end disposed within member 130.

It is preferred that tube 146 be of platinum because of its relative chemical inertness and because it can rather readily be matched to a number of glasses to effect a good bond therewith. In addition, tube 142 can easily be sealed at its end by a simple process arising out of the ductility of the metal. A preferred method of sealing the end of tube 146 is to employ rotatable tool 148 having an inverted conical working end. Tool 148 is placed as shown over the top of tube 146 and force applied on the tool axially with respect to tube 146 while the tool spins around that axis. Alternatively the top of tube 146 can be pressure crimped. Either method will effect on excellent, room temperature, spin-weld sealing of the tube. Following the sealing of the tube and withdrawal of the tool from member 130, coaxial cable 34 of the type heretofore described and having a short, pre-tinned, extending extremity of wire 38 thereof, is introduced into the interior of member 30 of FIGURE 6 until that pre-tinned extremity is adjacent the now-sealed end of tube 146. The tube and wire can then be readily joined by known radio-frequency induction soldering techniques, thereby completing an electrically conductive path from the ion-sensitive glass membrane of the electrode to the inner wire of the coaxial cable.

Since certain changes may be made in the above processes and products without departing from the scope of the invention herein involved it is intended that all matter contained in the above description or shown in the accompanying drawing shall be interpreted in an illustrative and not in a limiting sense.

What is claimed is:

1. A glass electrode for measurement of ionic concentration in a test fluid, said electrode comprising, in combination:

a first tubular body of glass having an ion-sensitive membrane occluding one extremity so as to form a chamber thereat;

a second tubular body of glass having one end thereof glass sealed, said second body being disposed within said first body with said one end adjacent said chamber;

said second body including an integral surrounding glass collar adjacent said one end and extending substantially perpendicularly from said second body into fused contact with the interior wall of said first body at a portion thereof adjacent said extremity so as to seal said chamber;

an electrically conductive wire disposed in said second body and having an end portion thereof extending through said sealed end into said chamber;

the portion of said lead within the said second body being surrounded by an electric shield encased within said second body; and an electrolytic material disposed within said chamber and forming an electrical contact between said membrane and the unshielded portion of said lead.

2. Method of making ion-sensitive glass electrodes comprising the steps of:

forming a first tubular body of glass having an ion-sensitive glass membrane occluding one extremity thereof;

forming an elongated member comprising a second tubular glass body sealed at one end and enclosing an electrically-conductive, shielded lead having an unshielded portion thereof extending through said one end, and an upstanding integral collar of glass surrounding said second body and extending substantially perpendicularly to the long axis of said member near said one end, said collar having a peripheral configuration which is slidingly fittable into a substantial portion of the interior of said first tubular body;

inserting said elongated member into said first tubular body so that said end portion of said lead is disposed adjacent said one extremity and membrane, and the entire periphery of said collar is adjacent a portion of the wall of said first body adjacent said one extremity;

heating said portion of said wall of said first body and the periphery of said collar until said portion and said periphery have fused to one another so as to form with said first body and said membrane a sealed chamber;

then introducing an electrolyte solution through an opening into said chamber in sufficient quantity to form an electrical contact between said lead and said membrane; and melting at said opening a quantity of glass so as to seal said opening.

3. Method of making ion-sensitive glass electrodes comprising the steps of:

forming a first tubular body of glass having for a substantial length thereof a substantially uniform internal cross-section and having at least a portion of one end thereof of substantially lesser internal cross-section and having an ion-sensitive glass membrane covering said one end;

forming an elongated member comprising a second tubular glass body glass-sealed at one end and enclosing an electrically-conductive, shielded lead having an unshielded portion thereof extending through said one end, and an upstanding integral collar of glass surrounding said second body and extending substantially perpendicularly to the long axis of said member near said one end, said collar having a peripheral configuration substantially matched to said uniform cross-section and slidingly fittable therein;

inserting said elongated member into said first tubular body until said collar engages the internal wall of said one end of said first body and said end portion of said lead is disposed adjacent said one extremity and membrane;

heating said portion of said wall of said first body and the periphery of said collar until said portion and said periphery have fused to one another so as to form with said first body and said membrane a sealed chamber;

then introducing an electrolyte solution through an opening into said chamber in sufficient quantity to form an electrical contact between said lead and said membrane; and sealing said opening.

4. Method of making ion-sensitive glass electrodes comprising the steps of:

forming a first tubular body of glass having one extremity thereof covered with a bulb of an ion-sensitive glass membrane, a portion of said body adjacent said one extremity having a predetermined internal cross-section dimension, the remainder of said body having a substantially uniform cross-section configuration which is greater in magnitude than said cross-section dimension;

forming an elongated member comprising an electrically conductive lead surrounded, except at an end portion, by electrical shielding, a second tubular body of glass encasing substantially only a shielded portion of said lead, and an upstanding collar of glass surrounding said second tubular body and extending substantially perpendicularly to the long axis of said member near said end portion, said collar having a peripheral configuration substantially matched to said uniform cross-section and slidingly fittable therein;

positioning said member in said first body with said collar engaging with said portion of said first body and said end portion of said lead adjacent said bulb;

heating the periphery of said collar and the adjacent wall of said first body until said periphery and adjacent wall are softened to a workable condition;

working the softened periphery of said collar and adjacent wall of said first body until said periphery and wall are fused to one another throughout the entire extent of said periphery to provide a chamber at said one extremity sealed from said remainder of said first body;

providing means adjacent the other extremity of said first body and the other end of said second body for supporting the latter in substantially fixed relation to said first body;

introducing after fusion of said wall and periphery to one another, a quantity of aqueous electrolyte solution into said bulb through an opening in a wall portion of said chamber other than said membrane; and sealing said opening.

5. A glass electrode as defined in claim 1 including means disposed adjacent the opposite extremity of said first tubular body for supporting said second tubular body in spaced relation to said first body.

6. A glass electrode for measurement of ionic concentration in a test fluid, said electrode comprising, in combination:

a first tubular body of glass having an ion-sensitive glass membrane occluding one extremity of said body so as to form a chamber thereat;

an elongated member comprising a second hollow tubular body of glass having one end thereof glass sealed, said second body having disposed in the interior thereof throughout substantially its entire length a coaxial cable, an extension of only the central conductor of said cable being sealed into said one end and extending unshielded outwardly therefrom, said second body being positioned substantially coaxially with said first body, an integral glass collar surrounding said second body adjacent said one end and extending substantially perpendicularly from said second body into fused contact with the interior wall of said first body adjacent said one extremity so as to seal said chamber from the interior of said first body and for supporting said second body in its coaxial position with said extension disposed within said chamber;

and an electrolyte material disposed within said chamber and providing an electrical contact between said membrane and said extension of said conductor.

7. A glass electrode as defined in claim 6 wherein said electrolyte material is an aqueous solution of a chloride and said extension of said central conductor is coated with an Ag-AgCl mass.

8. A glass electrode as defined in claim 6 including means disposed across the interior of said first body adjacent the other extremity thereof and in contact with said second body adjacent its other end for aiding in supporting said second body in said coaxial position.

9. A glass electrode as defined in claim 6 wherein said cable comprises a central electrically conductive wire surrounded by an electrically insulating sheath surrounded by an electrical shield and said extension is a metal having a coefficient of thermal expansion matched to the coefficient of thermal expansion of the glass of said sealed end of said second body.

10. Method as defined in claim 2 wherein said opening is formed in the wall of said first body between said one extremity and said portion of said wall.

11. Method as defined claim 2 wherein said opening is formed in said collar.

12. Method of making ion-sensitive electrodes as defined in claim 3 including the step of:

placing means adjacent said other end of said first body so as to support said elongated member in a coaxial position within said first body.

13. Method as defined in claim 4 wherein the sealing of said opening is effected by fusing glass into said opening.

References Cited by the Examiner
UNITED STATES PATENTS

| | | | |
|---|---|---|---|
| 2,256,733 | 9/1941 | Cary et al. | 204—195 |
| 2,311,977 | 2/1943 | Coleman | 204—195 |
| 2,340,642 | 2/1944 | Cameron | 204—195 |
| 2,697,070 | 12/1954 | Arthur | 204—195 |
| 2,755,243 | 7/1956 | Beckman et al. | 204—195 |
| 2,756,203 | 7/1956 | Gilbert | 204—195 |
| 2,977,293 | 3/1961 | Ingold | 204—195 |

FOREIGN PATENTS

| | | |
|---|---|---|
| 1,013,055 | 4/1952 | France. |
| 1,090,451 | 10/1960 | Germany. |
| 667,471 | 3/1952 | Great Britain. |

OTHER REFERENCES

"Analytical Chemistry," vol. 36, No. 6, May 1964, pp. 44A and 45A.

Mattock: "Ph. Measurement & Titration," 1961, page 247, "Science," vol. 82, No. 2130, Oct. 25, 1935, pp. 396 and 397.

JOHN H. MACK, *Primary Examiner.*

WINSTON A. DOUGLAS, *Examiner.*

T. TUNG, *Assistant Examiner.*